United States Patent [19]
Morin

[11] Patent Number: 5,774,927
[45] Date of Patent: Jul. 7, 1998

[54] SCREEN WIPER FOR A MOTOR VEHICEL, HAVING A BRACKET GIVING INDEXATION FOR FITTING PURPOSES AND LOCATION IN THE PARKED POSITION OF THE WIPER

[75] Inventor: Pascal Morin, Chatellerault, France

[73] Assignee: Valeo Systemes D'Essuyage, La Verriere, France

[21] Appl. No.: 594,264

[22] Filed: Jan. 30, 1996

[30] Foreign Application Priority Data

Jan. 31, 1995 [FR] France ................. 95 01200

[51] Int. Cl.$^6$ .................. B60S 1/04; B60S 1/32
[52] U.S. Cl. .................. 15/250.19; 15/250.16
[58] Field of Search ............ 15/250.19, 250.001, 15/250.351, 250.202, 250.16, 250.352

[56] References Cited

U.S. PATENT DOCUMENTS

| 2,284,844 | 6/1942 | Rappl | 15/250.19 |
|---|---|---|---|
| 4,040,141 | 8/1977 | O'Steen | 15/250.19 |
| 4,765,019 | 8/1988 | Ochino | 15/250.19 |
| 5,101,531 | 4/1992 | Edwards et al. | 15/250.19 |

FOREIGN PATENT DOCUMENTS

| 2636582 | 3/1990 | France. | |
|---|---|---|---|
| 63551 | 4/1983 | Japan. | |
| 179437 | 10/1984 | Japan. | |
| 60-354 | 3/1985 | Japan. | |

OTHER PUBLICATIONS

Patent Abstracts of Japan vol. 11 No. 330 (M-636), 38 Oct. 1987 and JP-A-62 113636 (Nissan Motor Co. Ltd.) 25 May 1987.

*Primary Examiner*—Gary K. Graham
*Attorney, Agent, or Firm*—Morgan & Finnegan, L.L.P.

[57] ABSTRACT

A screen wiper for a motor vehicle comprises a wiper arm carrying a wiper blade and applying a wiping pressure, so as to urge the latter against the windshield of the vehicle as the arm is oscillated in the usual way across the windshield by a drive spindle, which carries a drive head on which the wiper arm is fitted. The wiper arm carries a guide bracket which, in the parked position of the wiper, cooperates with an engagement surface of a ramp fixed to the vehicle body, so as to lift the wiper arm and so relieve the wiping pressure. The guide bracket has an indexing claw which cooperates with a claw formed on the ramp to define a precise angular orientation of the wiper for fitting of the latter on to the drive head.

10 Claims, 3 Drawing Sheets

SCREEN WIPER FOR A MOTOR VEHICEL, HAVING A BRACKET GIVING INDEXATION FOR FITTING PURPOSES AND LOCATION IN THE PARKED POSITION OF THE WIPER

FIELD OF THE INVENTION

The present invention relates to screen wipers for motor vehicles. More particularly, it relates to screen wipers for motor vehicles of the type comprising a wiper blade which is urged into contact with a glazed surface of the vehicle, such as its windshield, by a wiper arm articulated on a drive head which is mounted on a drive spindle, the latter being driven in alternate or oscillating motion by a drive unit; the wiper being also of the type which includes a guide bracket or sleeve which is carried by the wiper arm, the guide bracket being adapted so that, when the wiper is in its parked, or rest, position, the guide bracket cooperates with an engagement surface of a guide ramp fixed on the vehicle, in such a way as to lift the wiper arm, whereby at least to limit the wiping pressure which is applied by the wiper arm to the blade in order to urge the latter against the glazed surface.

BACKGROUND OF THE INVENTION

When the wiper is parked, that is to say when it is not in operation, no useful purpose is served by a high wiping pressure applied by the wiper arm to the blade. Indeed, this wiping pressure, if maintained over a long period of time, tends to deform the wiping strip of the blade irreversibly. This in turn gives rise to a tendency for the wiping strip to stick to the glass.

Various arrangements are known which enable the wiping pressure to be relieved when the wiper is parked. In particular, it is known to provide, for this purpose, a sleeve which is mounted on the wiper arm and which cooperates with a ramp fixed on the vehicle. The ramp causes the sleeve, in the parked position, to lift the wiper arm slightly and thus relieve the wiping pressure exerted on the blade.

However, there are other problems that remain to be solved. In this connection, it has been observed that it would be desirable to be able to prevent any lifting of the wiper blade clear of the glass when the wiper is not in use. This is necessary especially when the vehicle is being washed in an automatic roller-type washing plant.

It has also been noticed that, when the wiper is being fitted on the drive spindle, i.e. the shaft of the wiper drive motor of the vehicle, the absence of any accurate datum for fitting purposes leads to a substantial variation in the angular position assumed by the wiper, as between one vehicle and another.

DISCUSSION OF THE INVENTION

An object of the invention is to provide a screen wiping apparatus which not only enables the wiping pressure exerted by the wiper arm on the blade to be relieved in the parked position of the wiper, but which also secures the wiper in its parked position and, finally, provides angular indexation of the wiper while the wiper is being fitted to the vehicle.

According to the invention, a screen wiper for a motor vehicle, of the type comprising a wiper blade held by a wiper arm against a glass to be swept, the wiper arm being articulated on a drive head which is mounted on a drive spindle for driving the screen wiper in alternate wiping motion, and of the type that includes a guide bracket (or sleeve) which is mounted on the wiper arm and which, when the wiper is in its parked position, cooperates with an engagement surface of a guide ramp fixed on the vehicle, so as to lift the wiper arm and, at least, to limit the wiping pressure applied by the wiper blade to the glass, is characterised in that the guide bracket includes an indexing claw which cooperates with a claw of the ramp to provide precise location of the wiper, whereby to obtain precise, repeatable, fitting of the wiper on the vehicle.

The indexing claw of the guide bracket preferably has an indexing surface and a disengagement surface which are disposed substantially at right angles to each other, and which cooperate with complementary abutment surfaces on the claw of the guide ramp, so as, firstly, to determine an angular fitting position for the wiper and, secondly, to relieve the contact between the wiper blade and the glass.

The indexing claw preferably extends transversely from a side or lateral face of the guide bracket, in facing relationship with the guide ramp, and the ramp claw preferably extends transversely from a lower longitudinal edge of the engagement surface of the ramp.

In preferred embodiments, the indexing claw is in the form of a plate, on the edge of which are formed the indexing surface which is substantially horizontal, and the disengagement surface which is substantially vertical.

The said complementary abutment surfaces of the ramp claw, which consist of an indexing abutment surface and a disengagement abutment surface respectively, are preferably formed on an upper face and a lateral face, respectively, of the ramp claw.

The guide bracket preferably cooperates with the guide ramp so as to determine the angular parked position of the wiper. Preferably, this is achieved by cooperation of the guide bracket with the indexing abutment surface of the ramp claw, in such a way as to determine the angular parked position.

Preferably, the guide bracket includes a heel portion which projects obliquely on a lower longitudinal edge of the side face of the guide bracket, and which cooperates with the engagement surface of the ramp in order to reduce the pressure exerted by the wiper blade on the glass in the parked position of the wiper.

The guide bracket preferably cooperates with the guide ramp in such a way as to avoid any separation of the wiper blade from the glass when the wiper is in its parked position.

The ramp claw preferably includes, on its upper face comprising the indexing abutment surface, a longitudinal groove in which the heel portion of the guide bracket is received, the heel portion being adapted to cooperate with a lateral retaining surface of the groove so as to prevent accidental lifting of the wiper blade when the wiper is in its parked position.

The angular fitting position of the wiper, defined by the cooperation of the indexing claw with the ramp claw, is preferably offset angularly downwards with respect to the parked position defined by the cooperation of the guide bracket with the ramp claw, in such a way that the indexing claw automatically leaves its fitting position the first time the wiper is operated.

The wiper arm preferably comprises a shroud or casing extended by a bar, the guide bracket being fixed on the arm at the junction between the bar and the casing.

The guide bracket and ramp are preferably mouldings of plastics material.

Further features and advantages of the invention will appear more clearly from a reading of the following detailed description of a preferred embodiment of the invention, given by way of example only and with reference to the accompanying drawings.

DESCRIPTION OF A PREFERRED EMBODIMENT OF THE INVENTION

Figure 1:
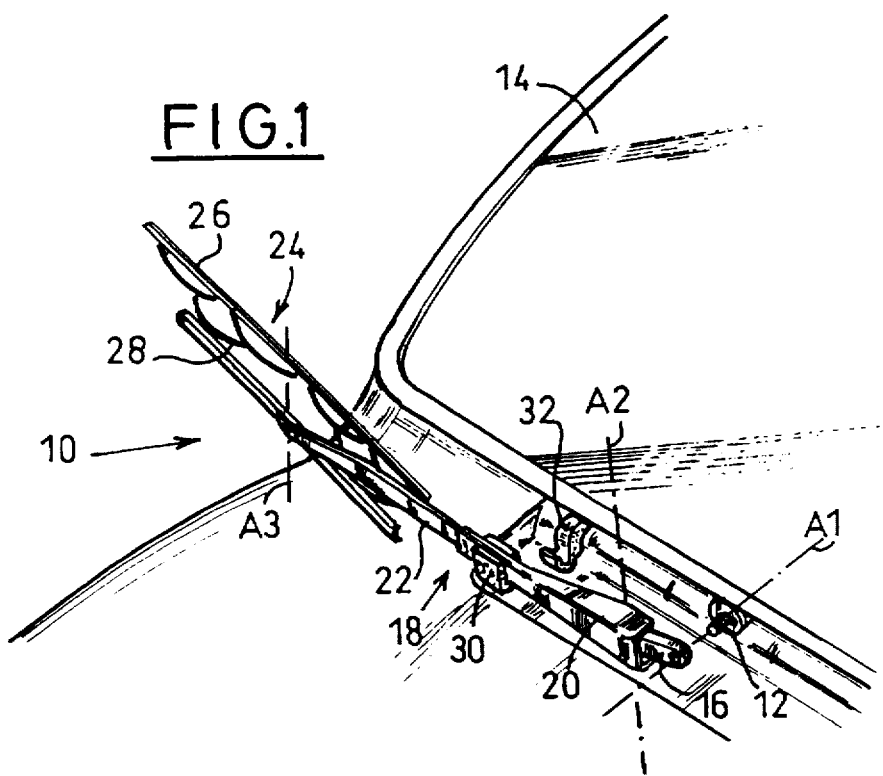
FIG. 1 is a perspective view which illustrates the fitting of a screen wiper on a motor vehicle in accordance with the invention.

Reference is first made to FIG. 1, which shows a screen wiper 10 for wiping the windshield 14 of a vehicle. The wiper is shown prior to being fitted on the end of a drive spindle 12. The screen wiper 10, once fitted and when in use, describes an alternate wiping motion about an axis A1 which is substantially perpendicular to a plane defined by the windshield 14 (referred to for simplicity here as the plane of the windshield).

The wiper 10 is fitted on the drive spindle 12 by means of a drive head 16 on which a screen wiper arm 18 is articulated about an axis A2 at right angles to the drive spindle axis A1. The wiper arm 18 consists of a wiper arm body, or casing, 20, which is extended by a support bar 22. A screen wiper blade 24, which includes a wiping strip 26 and a structure 28 supporting the strip 26, is articulated on the free end of the support bar 22, about an axis A3 which is substantially parallel to the axis A2.

FIG. 1 also shows a guide bracket 30 which is fitted on the screen wiper arm 18, and a guide ramp 32 mounted directly on the vehicle itself, just below the windshield 14. The bracket 30 is fitted on the wiper arm at the level of the connection between its casing 20 and support bar 22, in such a way as to hide the discontinuity in the profile of the wiper arm at this point, as can best be seen from FIG. 4.

Figure 2:
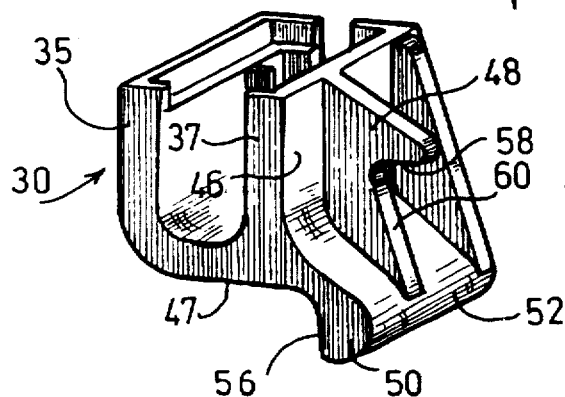
FIGS. 2 and 3 are detailed perspective views of a guide bracket according to the invention, seen from two different directions.
Figure 3:
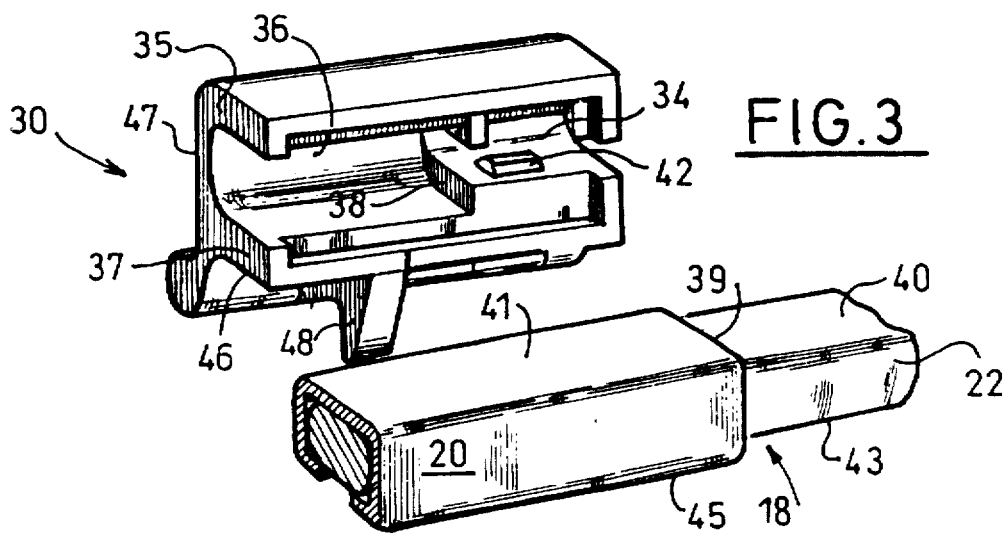

FIGS. 2 and 3, to which reference is now made, show a guide bracket 30 in one embodiment of the invention, and also the junction zone of the support bar 22 with the body 20 of the wiper arm 18. The bracket 30 has a generally U-shaped transverse cross section, and it is arranged to embrace the wiper arm 18 as shown. More precisely, as shown in FIG. 3, the bracket 30 has two U-shaped cavities 34 and 36, the dimensions of which, in cross section, are different so that they can snugly receive the support bar 22 and the wiper arm body 20, respectively.

The two cavities 34 and 36 are aligned longitudinally with each other, and the junction between them defines a transverse surface, or shoulder, 38 which cooperates with the axial end surface 39 of the arm body 20, so as to locate the bracket 30 axially on the wiper arm 18.

The U-shaped guide bracket 30 has two wing portions 35 and 37 facing towards each other. The anterior wing portion 35 cooperates with the respective anterior surfaces 40 and 41 of the support bar 22 and arm body 20, while the posterior wing portion 37 similarly cooperates with the corresponding posterior surfaces 43 and 45 respectively. The wing portion 37 of the bracket 30 also has a nib 42, on that part of its surface that is aligned with the lower surface 43 of the support bar 22. This nib 42 cooperates with a recess (not shown) which is formed in the same lower surface 43, so as to provide transverse location of, and to secure, the bracket 30 on the arm 18.

The bracket 30 also has an external rear side face 46, formed on its posterior wing portion 37 in facing relationship with the ramp 32, and a lower surface 47 which lies substantially at right angles to the side face 46. A bracket claw, or indexing claw, 48 and a heel portion 50 are formed on the side face 46. The heel portion 50 projects obliquely from the longitudinal lower edge of the side face 46. On the end portion of this heel portion 50 (see FIG. 2) a support zone 52 is formed. The support zone 52 is substantially parallel to the side face 46 and has a cylindrical profile. A retaining zone 56 is defined at the back of the support zone 52.

The indexing claw 48 is in the form of a plate element projecting at right angles to the side face 46 of the bracket 30, and is located substantially in the middle of the length of the latter. The claw 48 has a notch which defines two substantially orthogonal surfaces 58 and 60 on the back edge of this plate element. The surface 58 is an indexing surface, and the surface 60 is a disengagement surface; they are substantially horizontal and vertical respectively, defining a re-entrant angle between them.

Figure 4:
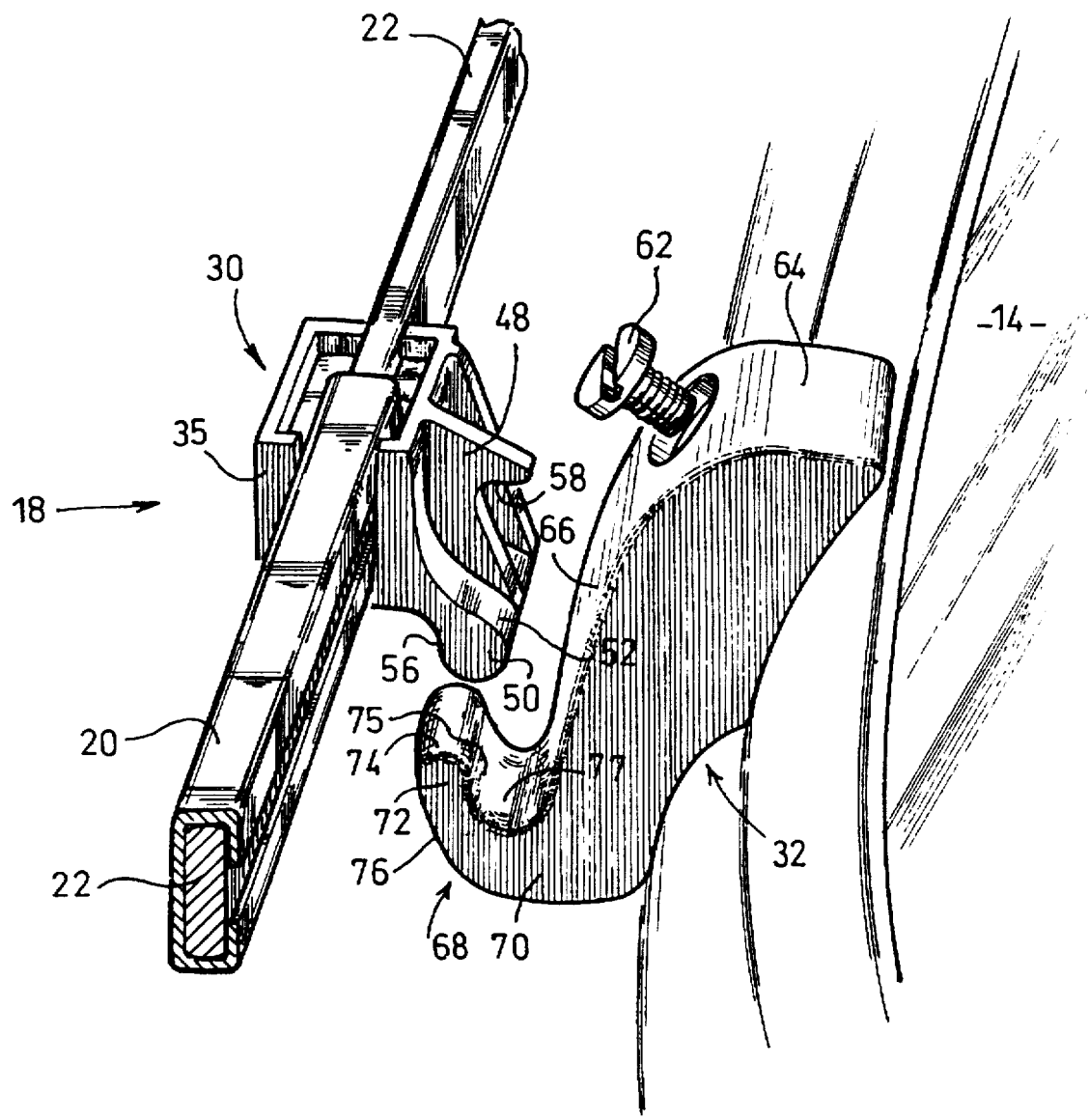
FIG. 4 is a perspective view showing a guide bracket in accordance with the invention mounted on a screen wiper arm, together with a guide ramp associated with the guide bracket.
Figure 5:
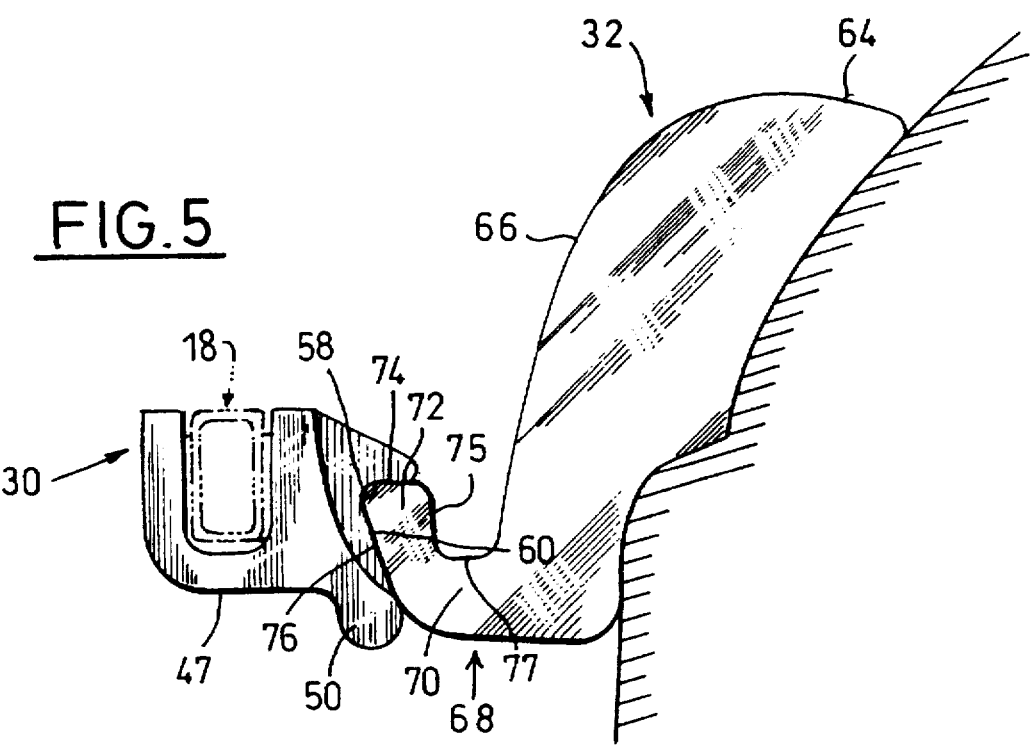
FIG. 5 is a view, seen partly in transverse cross section, of a guide bracket and guide ramp according to the invention, shown in its position for precise, repeatable fitting of the screen wiper.
Figure 6:
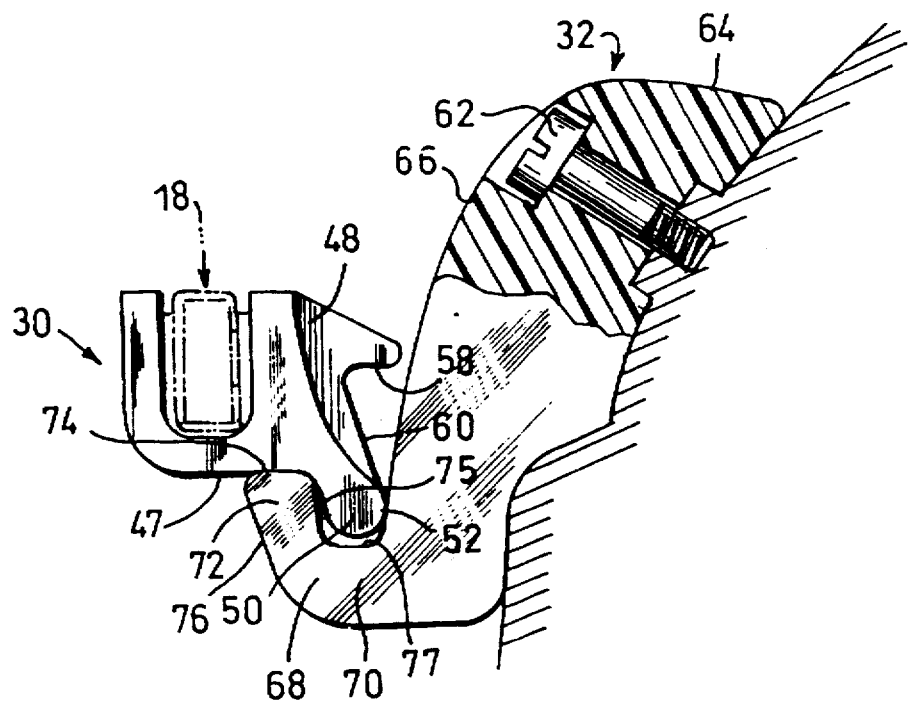
FIG. 6 is a view similar to FIG. 5, but here the guide ramp and guide bracket are shown in the parked position of the screen wiper.

Reference is now made to FIGS. 4 to 6. As is shown in FIG. 4, the guide ramp 32 is fixed on the bodywork of the vehicle at the bottom of the windshield, by means of a screw 62. The upper face of the ramp 32 consists of an impact surface 64 which is inclined with respect to the plane of the windshield. The impact surface 64 is extended downwards by an engagement surface 66 which is substantially parallel to the plane of the windshield, but which is offset transversely from the latter, i.e. forward of the plane of the windshield, towards the outside of the vehicle.

The ramp 32 is formed with a ramp claw 68 at its lower end. The claw 68 is L-shaped in transverse cross section, with the first or horizontal branch 70 of the L extending at right angles to the engagement face 66. The second branch 72 of the L is vertical and faces towards the engagement face 66 of the ramp, from which it is offset transversely towards the outside of the vehicle. The two branches 70 and 72 of the L-shaped ramp claw 68 thus define a longitudinal groove 77 on the upper side of the claw 68.

FIG. 5 shows, in cross section, the respective positions of the bracket 30 and ramp 32 when the claw 48 of the bracket 30 is in engagement with the claw 68 of the ramp 32 for the purpose of locating the screen wiper 10 for fitting of the latter in a precise, repeatable position on the vehicle. Here, the indexing claw 48 is in contact with the vertical second branch 72 of the ramp claw 68, the indexing surface 58 and disengagement surface 60 of the indexing claw 48 being in engagement with corresponding abutment surfaces 74 and 76 respectively of the branch 72. These abutment surfaces define between them a projecting acute angle. The surface 74 will be referred to as an "indexing abutment surface", and the surface 76 as a "disengagement abutment surface".

FIG. 6 shows, in cross section, the bracket 30 and the ramp 32 when the heel portion 50 of the bracket is in cooperating engagement with the engagement surface 66 of the ramp. This is the rest or parked position of the windshield wiper.

Angular orientation in the parked position is determined by the cooperation of the lower surface 47 of the bracket 30 with the upper surface 74 of the vertical second branch 72 of the ramp claw 68. At the same time, the heel portion 50 of the bracket is in contact, through its support zone 52, on the engagement face 66 of the ramp 32. This causes the wiper arm 18 to be displaced away from the plane of the windshield 14, so that as a result, the force exerted on the wiper blade by the wiper arm 18 is reduced. Undue deformation of the wiping strip 26 (FIG. 1) is thus avoided.

In addition, when the wiper 10 is in its parked position, if it is then subjected to a force which tends to lift the blade away from the windshield, the retaining zone 56 of the heel portion 50 of the bracket 30 makes contact with an inner face 75, facing towards it, of the second branch 72 of the ramp claw 68. This prevents the wiper blade 24 from being raised accidentally.

Fitting of the screen wiper 10 takes place as follows. The operator, or the robot, takes the wiper arm 18 and engages the indexing claw 48 of the bracket 30 with the ramp claw 68. The arm 18 and blade 24 are then in an offset position with respect to the plane of the windshield 14. The arrangement enables the wiper arm 18 to be firmly held in this position. In this connection, there is now enough space between the wiper arm 18 and the windshield 14 to enable the operator to insert his fingers.

This offset also enables the drive head 16 to be aligned on the axis A1 (FIG. 1) of the drive spindle 12, which facilitates engagement of the head 16 on the spindle 12.

A further feature of this indexing system is that, after fitting has been carried out, the screen wiper can be left in the fitting position shown in FIG. 5. In this connection, when the wiper is used for the first time, the bracket 30 becomes displaced upwardly from its FIG. 5 position. The disengagement surface 60 of the bracket claw 48 and the support zone 52 of the heel portion 50 of the bracket slide on the second branch 72 of the ramp claw 68 until, under the influence of the wiping pressure applied by the screen wiper arm 18, the heel portion 50, which has by now risen above the level of the indexing abutment surface 74 of the branch 72 of the ramp claw 68, makes contact once again with the engagement surface 66 of the ramp 32, and slides over the latter.

At the end of the first, and each subsequent, period of operation of the screen wiper, the wiper returns to its parked position, that is to say the wiper, with the bracket 30, is displaced downwards with reference to FIG. 4. The support zone 52 of the heel portion 50 then makes contact with the inclined impact surface 64 of the ramp 32. It then climbs over the surface 64, after which it follows the engagement surface 66 downwardly until the lower surface 47 of the bracket 30 makes contact with the upper abutment surface 74 of the ramp claw 68.

Accordingly, the guide bracket 30 provides an abutment which defines the angular orientation of the screen wiper 10 in its parked position.

Without departing from the scope of the present invention, the screen wiper may be fully disengaged in its parked position, that is to say the wiping strip carried by the wiper blade may be arranged to be no longer in contact with the swept surface of the windshield or with the bodywork of the vehicle.

What is claimed is:

1. An apparatus for use on a vehicle having a screen and a wiper arm having a parked position and a fitting position, the apparatus comprising:
   a guide bracket configured to be mounted on the wiper arm, the guide bracket including an indexing claw having an indexing surface;
   a guide ramp configured to be mounted on the vehicle, the guide ramp having an engagement surface and a ramp claw having an index abutment surface complementary to the indexing surface; and
   wherein the indexing surface cooperates with the indexing abutment surface to define the fitting position; and
   wherein the guide bracket has a side face defining a longitudinal lower edge of the side face, and a heel portion projecting obliquely from the longitudinal lower edge for cooperation with the engagement surface of the guide ramp to reduce wiping pressure in the parked position.

2. Apparatus according to claim 1, wherein the wiper arm comprises a shroud and a support bar attached to the shroud, there being a junction between the shroud and the support bar, the guide bracket being configured to fit over the junction.

3. An apparatus for use on a vehicle having a screen and a wiper arm having a parked position and a fitting position, the apparatus comprising:
   a guide bracket configured to be mounted on the wiper arm, the guide bracket including an indexing claw having an indexing surface and a heel portion protruding therefrom;
   a guide ramp configured to be mounted on the vehicle, the guide ramp having an engagement surface and a ramp claw having an index abutment surface complementary to the indexing surface;
   wherein the indexing surface cooperates with the indexing abutment surface to define the fitting position; and
   wherein the guide bracket and guide ramp are adapted for cooperation with each other whereby to avoid complete disengagement of the wiper blade from the screen in the parked position, the indexing abutment surface defining a longitudinal groove therein for receiving the heel portion in the parked position, the groove having an inner face for cooperation with the heel portion to retain the heel portion, and so prevent accidental lifting of the wiper arm in the parked position.

4. Apparatus according to claim 3, wherein the guide bracket and guide ramp are so configured that the fitting position of the wiper is offset angularly downwards with respect to the parked position so that the indexing claw automatically leaves the fitting position on actuation of the wiper arm.

5. An apparatus for use on a vehicle having a screen, a wiper arm having a parked position and a fitting position, and a drive spindle having a drive spindle axis to actuate the wiper arm, the apparatus comprising:
   a guide bracket configured to be mounted on the wiper arm, the bracket including a protruding heel portion and an indexing claw having an indexing surface and a disengagement surface; and
   a ramp configured to be mounted on the vehicle, the ramp including an engagement face, which is offset from the screen when the ramp is mounted on the vehicle, and a ramp claw having a first branch and a second branch defining a groove therebetween, the groove receiving the heel portion when the wiper arm is in the parked position, wherein the second branch prevents the wiper arm from accidentally offsetting further away from the screen, and wherein the indexing claw engages the second branch when the wiper arm is in the fitting position.

6. The apparatus of claim 5 wherein the indexing surface and the disengagement surface form substantially a right angle, and wherein the second branch includes an indexing abutment surface complementary to the indexing surface, and a disengagement abutment surface complementary to the disengagement surface, engagement of the indexing surface with the indexing abutment surface and engagement of the disengagement surface with the disengagement abutment surface placing the guide bracket in a predetermined angular orientation in the fitting position.

7. The apparatus of claim 6 wherein the wiper arm has a given path of movement when actuated and wherein the disengagement surface and the disengagement abutment surface are configured to be angled toward the given path when the wiper arm is in the fitting position, the disengagement surface and the disengagement abutment surface thus being slidably disengagable upon activation of the wiper arm.

8. The apparatus of claim 6 wherein the indexing claw is a plate having a free edge face, the indexing surface being on the free edge face and the disengagement surface being on the free edge face.

9. The apparatus of claim 6 wherein the second branch has an upper face, the indexing abutment surface defined on the upper surface, and a lateral face, the disengagement abutment surface defined on the lateral face.

10. The apparatus of claim 6 wherein the guide bracket and the ramp are formed from plastic.

* * * * *